June 20, 1967   D. L. GOODLOE   3,326,386
EGG HOLDER
Filed Jan. 21, 1965
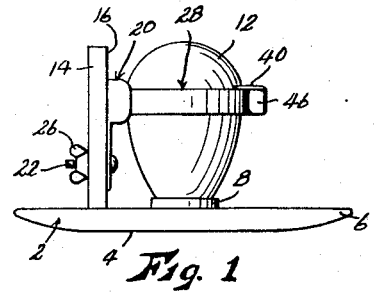
Fig. 1
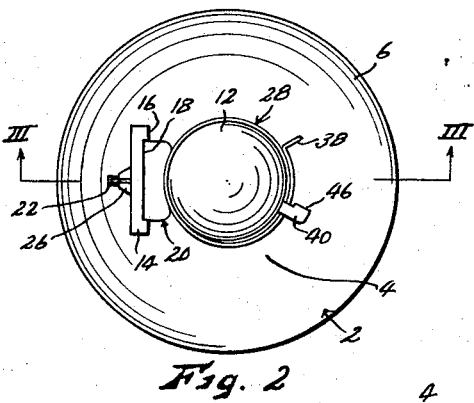
Fig. 2
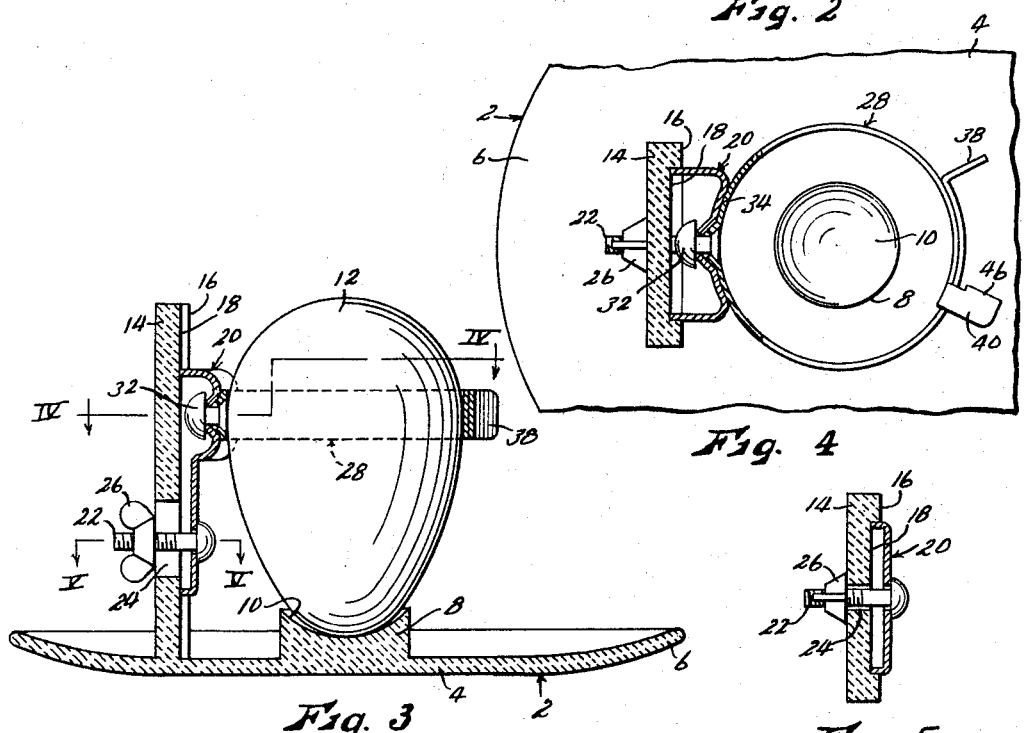
Fig. 4
Fig. 3
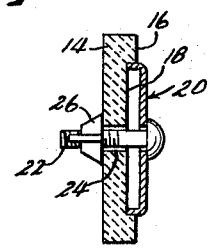
Fig. 5
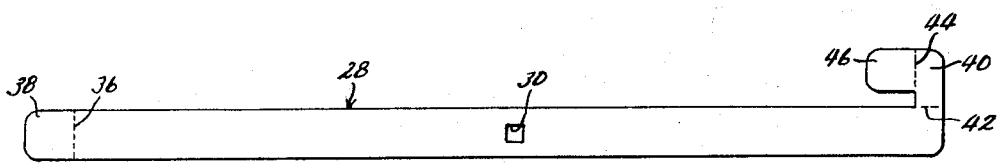
Fig. 6
INVENTOR.
Durrill L. Goodloe
BY John A. Hamilton
Attorney.

United States Patent Office 3,326,386
Patented June 20, 1967

3,326,386
EGG HOLDER
Durrill L. Goodloe, 607 Browning,
Lee's Summit, Mo. 64063
Filed Jan. 21, 1965, Ser. No. 427,014
2 Claims. (Cl. 211—14)

This invention relates to new and useful improvements in egg holders, and has particular reference to egg holders of the type adapted to support soft-boiled eggs while a portion of the shell is broken away and the contents spooned from the remaining portion of the shell, egg "cups" being the most common instance of this general type of holder.

The principal objects of the present invention are the provision of an egg holder of the character described which holds the egg firmly against wobbling or rocking, so that it need not be held or steadied by hand either while breaking the shell or when spooning out its contents, and which is readily adjustable to accommodate eggs of many different sizes.

Other objects are simplicity and economy of construction, efficiency and dependability of operation, and adaptability to provide a guide permitting accurate breaking and removal of a portion of the egg shell.

With these objects in view, as well as other objects which will appear in the course of the specification, reference will be had to the accompanying drawing, wherein:

FIG. 1 is a side elevational view of an egg holder embodying the present invention, with an egg mounted operatively therein, FIG. 2 is a top plan view of the holder and egg as shown in FIG. 1, FIG. 3 is an enlarged sectional view taken on line III—III of FIG. 2, with parts left in elevation, FIG. 4 is a fragmentary sectional view taken on line IV—IV of FIG. 3, with the egg omitted, FIG. 5 is a sectional view taken on line V—V of FIG. 3, and FIG. 6 is a laid-out view of the blank from which the spring clamp is formed.

Like numerals apply to similar parts throughout the several views, and the numeral 2 applies to a base having the form of an ordinary circular saucer, with a planar central portion 4 and an upturned peripheral lip 6. It may be formed of china, pottery, plastic or any other suitable material. Centrally thereof, said base has an integral, upstanding pedestal 8. Said pedestal is circular, and the upper end thereof is recessed to form a socket 10 adapted to receive and support therein the smaller end of an egg 12. Also formed integrally with the base is a vertical post 14 which is generally rectangular in cross-section, with one of its broader surfaces 16 toward pedestal 8, but spaced apart therefrom. A groove 18 is formed in surface 16 of the post.

Mounted for vertical sliding movement in groove 18 is a clamp carrier 20 formed of sheet metal, preferably stainless steel, said carrier being of such width as to fit snugly in groove 18 so that it cannot turn about a horizontal axis, and being adjustably secured to the post by a bolt 22 extending through the carrier and through a vertically elongated slot 24 formed in post 14, said bolt having a wing nut 26 threaded thereon at the back of the post, whereby the carrier may be adjusted vertically on the post and clamped at any desired elevation.

A clamp ring 28 of generally circular form and disposed in a horizontal plane is mounted on carrier 20, so as to be disposed above and generally coaxial with pedestal 8. Said clamp consists of an elongated strip of flat spring steel, as shown in FIG. 6, formed into a generally cylindrical curvature, with its end portions overlapping as best shown in FIG. 4. Said strip has a hole 30 formed therein approximately at its midpoint for receiving a rivet 32 affixing the strip to carrier 20. As indicated, hole 30, and also rivet 32 and the hole therefor in carrier 20, are square in order to prevent possible turning of the clamp about the rivet as an axis, in order to maintain the clamp in a horizontal plane. Also, the face of the carrier engaged by the clamp strip is arcuately curved adjacent the rivet, as indicated at 34, in order to support the clamp strip more positively and accurately.

As stated above, the end portions of the clamp strip are disposed in overlapping relation at a point remote from post 14. The outer of these end portions is bent radially outwardly on fold line 36 (see FIG. 6), to form a finger tab 38. The inner of the overlapping end portions is provided with a lateral projection 40 (see FIG. 6) which is bent radially outwardly on fold line 42 to project outwardly over the top edge of the outer end portion, and bent downwardly on fold line 44 to form a finger tab 46.

Operation of the holder is believed to be obvious. By grasping finger tabs 38 and 46 between the thumb and forefinger of one hand and drawing said tabs closer together, the clamp ring is expanded to a sufficiently large diameter to permit insertion of the egg 12 as shown, with its smaller end down and resting in socket 10 of pedestal 8. The finger tabs are then released, whereupon the clamp contracts resiliently to grip the egg therein substantially at its horizontal plane of greatest diameter. By loosening bolt 22, carrier 20 may be adjusted vertically on the post to position the clamp at the desired elevation on the egg. The clamp ring is preformed so that it normally assumes a diameter less than that of the smallest egg likely to be inserted therein. Of course the clamp will not remain precisely concentric with pedestal 8 when gripping eggs of all diameters, but the normal variation of diameter of eggs is sufficiently small that the resultant slight tilting of the egg will not be objectionable.

Thus the egg is held firmly and securely, and the top portion of the shell, above the clamp ring, may be broken away with a spoon or other implement, and the contents spooned out of the lower portion of the shell, without necessity of touching or holding the hot egg to steady it. The egg is of course normally lifted from the water in which it has been boiled, and inserted in the holder, by means of a pair of tongs or other suitable implement. Thus the egg need never be touched by the hands. Moreover the clamp has other useful functions. It serves as a guide indicating the portion of the egg shell which should properly be broken away. Also, the generally even compressive force exerted thereby on the egg appears to stiffen or reinforce the egg shell around its line of contact with the clamp, so that when the top portion of the shell is broken and removed, the fracture lines are not likely to extend below the clamp, an occurrence which could of course cause spillage of its contents.

While I have shown and described a specific embodiment of my invention, it will be readily apparent that many minor changes of structure and operation could be made without departing from the spirit of the invention as defined by the scope of the appended claims.

I claim:
1. An egg holder comprising:
 (a) a base having an upwardly opening socket formed therein for receiving therein the lower end of an egg having its major axis arranged vertically,
 (b) a vertically upstanding post affixed to said base in spaced relation from said socket, and
 (c) a split, resilient clamp ring disposed above and generally concentrically with said socket, and con- stituting an elongated strip of resilient material formed in circular shape with its end portions overlapping and being affixed at approximately its midpoint to said post, whereby to engage clampingly about said egg, the extreme end portions of said strip having finger tabs affixed thereto and extending radially outwardly from said ring in angularly spaced apart relation.

2. An egg holder as recited in claim 1 wherein said lamp ring constitutes an elongated strip of resilient material formed in circular shape with its end portions overapping and being attached at approximately its midpoint o said post, the extreme end portions of said strip having finger tabs affixed thereto and extending radially outwardly from said ring.

References Cited
UNITED STATES PATENTS

| | | | |
|---|---|---|---|
| 666,045 | 1/1901 | Beeson | 248—97 |
| 1,672,033 | 6/1928 | Mallins | 248—346 |
| 2,006,358 | 7/1935 | Kurkjian | 24—256 |

FOREIGN PATENTS 45,728  10/1928  Norway.

CHANCELLOR E. HARRIS, *Primary Examiner.*

J. PETO, *Assistant Examiner.*